United States Patent
Kobayashi

(10) Patent No.: US 12,490,289 B2
(45) Date of Patent: Dec. 2, 2025

(54) COMMUNICATION SYSTEM AND COMMUNICATION CONTROL DEVICE

(71) Applicant: Fujitsu Limited, Kawasaki (JP)

(72) Inventor: Takaharu Kobayashi, Yamato (JP)

(73) Assignee: FUJITSU LIMITED, Kawasaki (JP)

(*) Notice: Subject to any disclaimer, the term of this patent is extended or adjusted under 35 U.S.C. 154(b) by 599 days.

(21) Appl. No.: 17/963,404

(22) Filed: Oct. 11, 2022

(65) Prior Publication Data

US 2023/0284255 A1 Sep. 7, 2023

(30) Foreign Application Priority Data

Jan. 28, 2022 (JP) .................. 2022-012055

(51) Int. Cl.
*H04W 72/54* (2023.01)
*H04W 16/14* (2009.01)
*H04W 72/542* (2023.01)

(52) U.S. Cl.
CPC ......... *H04W 72/542* (2023.01); *H04W 16/14* (2013.01)

(58) Field of Classification Search
CPC ............................ H04W 72/542; H04W 16/14
See application file for complete search history.

(56) References Cited

U.S. PATENT DOCUMENTS

| | | |
|---|---|---|
| 2015/0358829 A1 | 12/2015 | Arnott et al. |
| 2022/0394714 A1* | 12/2022 | Agrawal .............. H04W 72/23 |

FOREIGN PATENT DOCUMENTS

| | | |
|---|---|---|
| JP | 2016-111637 A | 6/2016 |
| JP | 2016-517189 A | 6/2016 |

* cited by examiner

*Primary Examiner* — Curtis B Odom
(74) *Attorney, Agent, or Firm* — Myers Wolin, LLC

(57) ABSTRACT

A communication system includes a plurality of first communication control devices that are arranged in association with a plurality of operators, and a second communication control device that is connected to the first communication control devices. The first communication control device calculates an effect evaluation value in a case where bands used by an operator of subject are increased and reduced and transmits information containing the effect evaluation value to the second communication control device. The second communication control device specifies a combination of radio devices and a combination of operators that maximize a value of change in a case where each operator changes the used bands of the radio devices and instructs the first communication control devices corresponding to the operators of the specified combination to increase and reduce the used bands of the radio devices of the specified combination.

6 Claims, 8 Drawing Sheets

FIG.6

| BAND REDUCED | BAND INCREASED | EFFECT EVALUATION VALUE |
|---|---|---|
| RU#0 | RU#1 | - |
| RU#0 | RU#2 | - |
| RU#0 | RU#3 | 1.2 |
| RU#0 | RU#4 | 0.5 |
| RU#0 | RU#5 | -0.3 |
| ⋮ | ⋮ | ⋮ |
| RU#3 | RU#0 | -1.7 |
| RU#3 | RU#1 | 0.8 |
| RU#3 | RU#2 | 0.6 |
| ⋮ | ⋮ | ⋮ |
| RU#5 | RU#2 | - |
| RU#5 | RU#3 | - |
| RU#5 | RU#4 | - |

# COMMUNICATION SYSTEM AND COMMUNICATION CONTROL DEVICE

CROSS-REFERENCE TO RELATED APPLICATION

This application is based upon and claims the benefit of priority of the prior Japanese Patent Application No. 2022-012055, filed on Jan. 28, 2022, the entire contents of which are incorporated herein by reference.

FIELD

The embodiments discussed herein are related to a communication system and a communication control device.

BACKGROUND

In radio communication systems, services using the 5th Generation Mobile Communication (5G) enabling enhanced mobile broadcast data communications have been increasingly introduced recently. In services using the 5G, for example, radio waves of higher frequencies than those of the LTE (Long Term Evolution), etc., such as millimeter waves, are used. Such high-frequency radio waves have high straightforwardness and do not pass through a shield easily and thus the cell diameter tends to be small. As a result, in construction of a radio communication system, setting base station devices densely is needed.

Specifically, because the base station devices are separated into base band devices (CU/DU: Central Unit/Distributed Unit) that execute baseband processing and radio units (RU) that execute radio processing, the RUs with antennas are arranged densely. Thus, a mobile network operator (MNO) that constructs a radio communication system is able to increase the communication area and the system capacity efficiently by setting RUs that are sharable with other MNOS collaboratively.

Patent Document 1: Japanese Laid-open Patent Publication No. 2016-111637
Patent Document 2: Japanese National Publication of International Patent Application No. 2016-517189

SUMMARY

According to an aspect of the embodiments, a communication system includes a plurality of first communication control devices that are arranged in association with a plurality of operators; and a second communication control device that is connected to the first communication control devices, wherein the first communication control device includes a first processor configured to execute a process of, with respect to each combination of radio devices that the operators share, calculating an effect evaluation value in a case where bands used by an operator of subject are increased and reduced; and a first transmitter configured to transmit information containing the effect evaluation value to the second communication control device, and the second communication control device includes a receiver configured to receive the information containing the effect evaluation value from each of the first communication control devices; a second processor configured to execute a process of: using the effect evaluation value of each combination of radio devices in each operator, specifying a combination of radio devices and a combination of operators that maximize a value of change in a case where each operator changes the used bands of the radio devices, and generating instruction information that instructs the first communication control devices corresponding to the operators of the specified combination to increase and reduce the used bands of the radio devices of the specified combination; and a second transmitter configured to transmit the instruction information.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

BRIEF DESCRIPTION OF DRAWINGS

FIG. 6 is a table illustrating a specific example of table information;

DESCRIPTION OF EMBODIMENTS

It is possible, as a method of setting RUs ("shared RUs" below) that are shared by a plurality of MNOs, that dedicated RUs for respective MNOs that are already set are replaced with shared RUs. As a result, the CU/DC of each MNO is connected to a larger number of shared RUs than that in the case where each MNO is connected to the dedicated RU and a front haul (FH) network that connects the CU/DUs and the shared RUs is shared by the MNOs. It is possible that, for example, a communication control device, such as an RIC (RAN Intelligent Controller), controls band allocation to the MNOs such that bands of the FH network are allocated to the respective MNOs appropriately.

When the communication control device controls the band allocation to the MNOs, however, there is a problem in that the amount of information that is consolidated in the communication control device increases and the amount of information transfer to the communication control device increases. Specifically, for example, it is possible that the communication control device that controls the CU/DUs of the MNOs cross-sectionally collects sets of reception quality information on the terminal devices that belong to all the MNOs and determines bands of the FH network to be allocated to the respective MNOs according to the reception quality information. In such a case, because sets of reception quality information on all the terminal devices that belong to all the MNOs are consolidated in the communication control device, information transfer concentrates on the communication control device and the communication network is compressed.

Preferred embodiments will be explained with reference to accompanying drawings. Note that the embodiment does not limit the disclosure.

Figure 1:
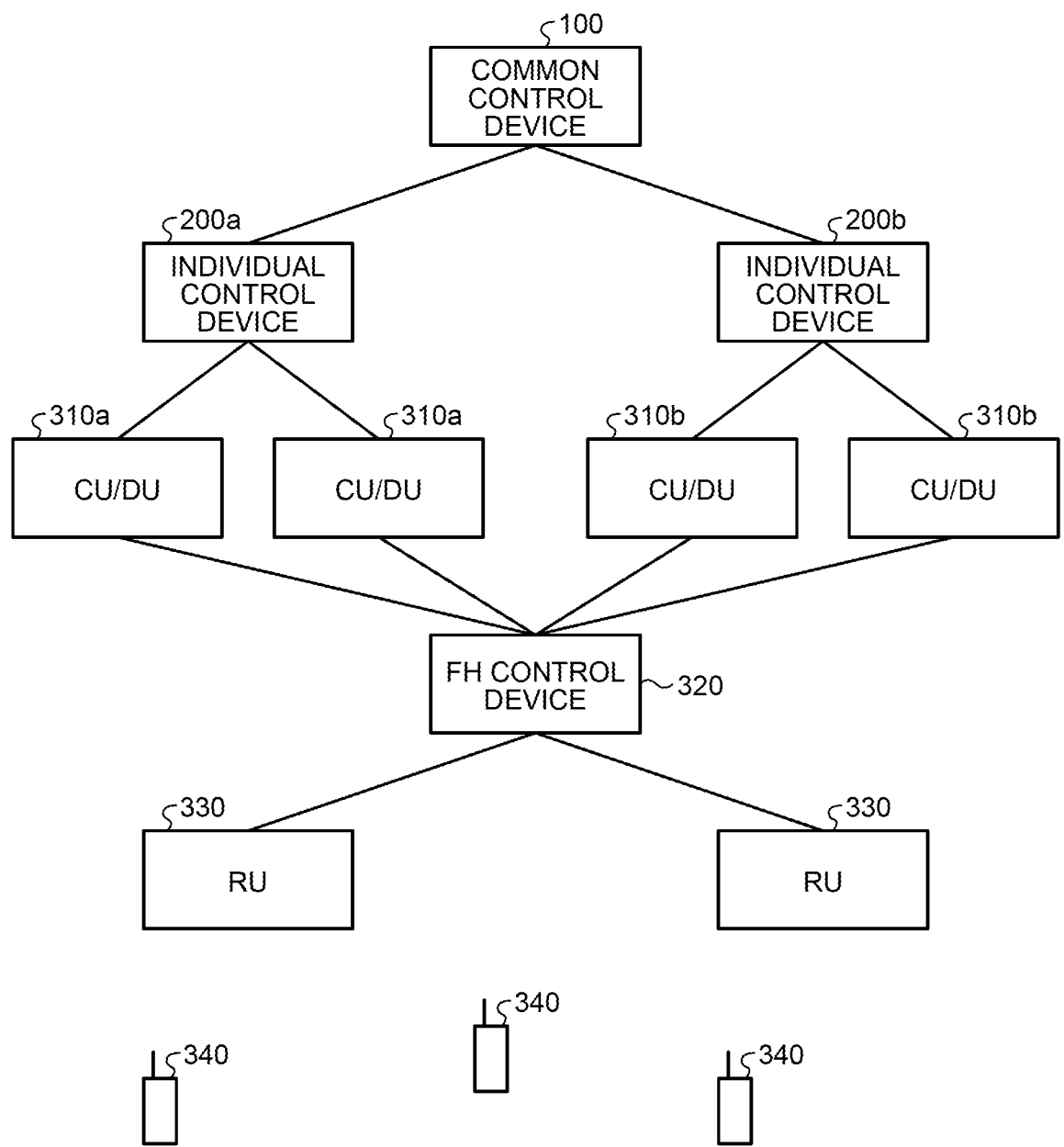
FIG. 1 is a diagram illustrating an example of a configuration of a communication system.

FIG. 1 is a diagram illustrating an example of a configuration of a communication system according to the embodiment. In the communication system illustrated in FIG. 1, a plurality of CU/DUs 310 that are managed by different MNOs share a plurality of RUs. In other words, for example, CU/DUs 310a of a first MNO and CU/DUs 310b of a second MNO are connected to the RUs 330 via an FH control device 320. The CU/DUs 310a of the first MNO are connected to an individual control device 200a that controls communications in the first MNO and the CU/DUs 310b of the second MNO are connected to an individual control device 200b that controls communications in the second MNO. The individual control device 200a and 200b are connected to a common control device 100 that controls communications in each of the MNOs cross-sectionally.

The common control device 100 is referred to as, for example, a Non-RT RIC (non-real time RIC), or the like, and controls base stations over a plurality of MNOs. In other words, the common control device 100 controls the CU/DUs 310a and 310b that are baseband devices that configure base stations. Specifically, the common control device 100 acquires information on evaluation on effects caused when the bands of the RUs 330 that are allocated to the respective MNOs are changed from the individual control devices 200a and 200b and determines to increase and reduce the bands that are allocated to the respective MNOs such that the value of changing the bands is maximized. The common control device 100 instructs the individual control devices 200a and 200b to increase and reduce the bands of the respective RUs 330 that are allocated to the respective MNOs, thereby changing the bands of the respective RUs 330 that are used by the CU/DUs 310a and 310b.

The detailed configuration and the detailed operations of the common control device 100 will be described in detail below.

The individual control devices 200a and 200b are referred to as, for example, near-RT RICs (near real time RIC), or the like, and each of the individual control devices 200a and 200b controls base stations of a single MNO. In other words, the individual control device 200a controls the CU/DUs 310a configuring the base stations of the first MNO and the individual control device 200b controls the CU/DUs 310b configuring the base stations of the second MNO. Specifically, the individual control devices 200a and 200b collect, from sets of user equipment (UE) 340 that belong to their corresponding MNOs, sets of reception quality information each between the UE 340 and the RU 330 and calculate effect evaluation values that evaluate effects in the case where the bands of the respective RUs 330 used by the MNOs of subject increase and decrease. The individual control devices 200a and 200b generate table information that stores the effect evaluation values of respective combinations of the RUs 330 whose corresponding used bands increase and decrease and transmit the table information to the common control device 100. Thereafter, when the individual control devices 200a and 200b are instructed to increase and reduce the bands of the respective RUs 330 that are allocated to the MNOs of subject, the individual control devices 200a and 200b determine bands used by the MNOs of subject with respect to the respective RUs 330 and notifies the CU/DUs 310a and 310b of the bands that are used.

Detailed configurations and operations of the individual control devices 200a and 200b will be described in detail below. Note that the individual control devices 200a and 200b are sometimes collectively referred to as "individual control devices 200" in the following description.

The CU/DUs 310a and 310b are baseband devices that configure the base stations. The CU/DUs 310a and 310b are connected to core networks of the respective MNOs, which are not illustrated in the drawings, and execute baseband processing on sets of data of the respective MNOs. The CU/DUS 310a and 310b are connected to the RUs 330 via the FH network and acquire reception quality information on the UE 340 that has radio communication with each of the RUs 330 and that the MNO of subject manages. The CU/DUs 310a and 310b notify the individual control devices 200a and 200b of the MNOs of subject of the acquired reception quality information.

When the individual control devices 200a and 200b notify the CU/DUs 310a and 310b of the bands used by the MNOs of subject with respect to the respective RUs 330, the CU/DUs 310a and 310b execute scheduling in the used bands and transmits or receives data to or from the RUs 330 via the FH network.

In the following description, the CU/DUs 310a and 310b are sometimes collectively referred to as "CU/DUs 310".

The FH control device 320 is provided on the FH network and is connected to the CU/DUs 310a and 310b and the RUs 330.

The RUs 330 are radio devices that configure base stations. The RUs 330 are connected to the CU/DUs 310a and 310b corresponding to the MNOs and execute radio processing on data. In other words, the RUs 330 transmits and receives data by radio to and from the UE 340 in a cell. The RUs 330 communicate with the CU/DUs 310a and 310b using the used bands of the respective MNOs that are allocated to the respective MNOs and communicate with the UE 340 that the respective MNOs manage.

The sets of the UE 340 are terminal devices capable of radio communications. The UE 340 executes radio communication with the RUs 330 that form a cell in which the device of subject exists. The UE 340 is managed by any one of the MNOs that share the RUs 330 and transmits and receives data to and from the CU/DUs 310a and 310b of the MNO.

Figure 2:
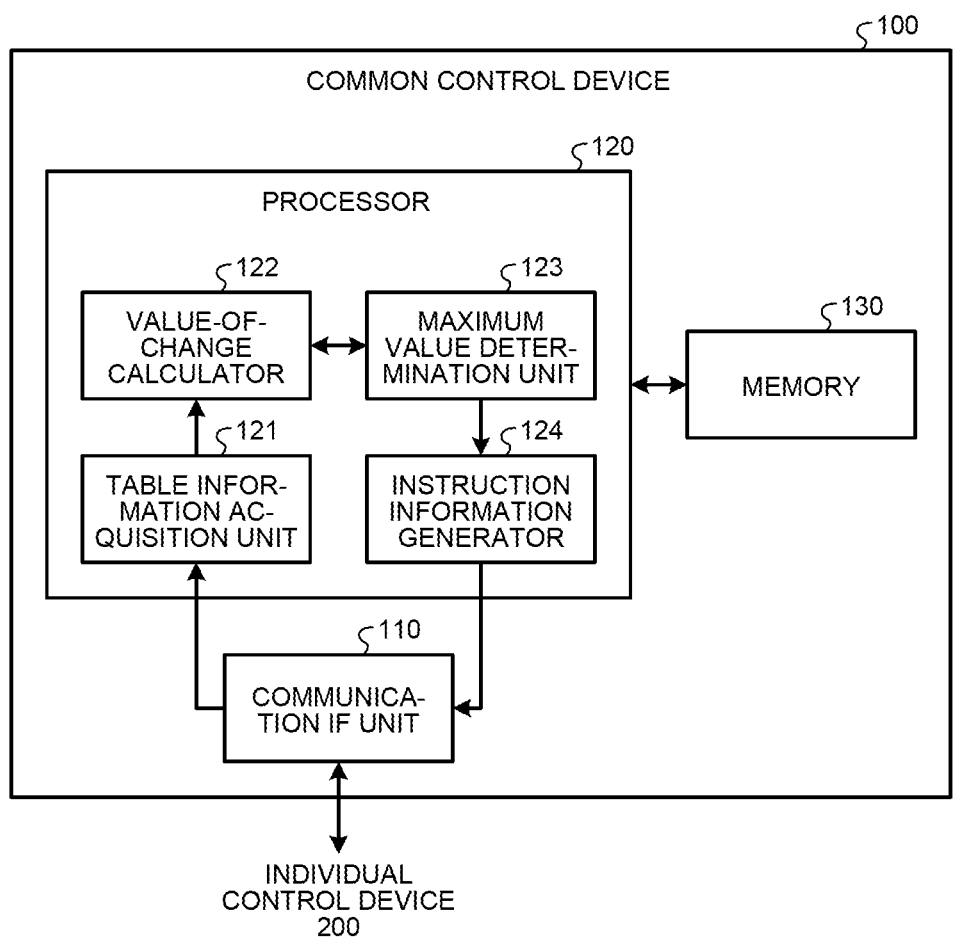
FIG. 2 is a block diagram illustrating a configuration of a common control device according to an embodiment.

FIG. 2 is a block diagram illustrating a configuration of the common control device 100 according to the embodiment. The common control device 100 according to the embodiment includes a communication interface unit (simply referred to as a "communication IF unit" below) 110, a processor 120, and a memory 130.

The communication IF unit 110 is connected to the individual control devices 200, receives information from the individual control devices 200, and transmits information to the individual control devices 200. Specifically, the communication IF unit 110 receives table information that stores effect evaluation values in the case where the used bands are increased and reduced with respect to combinations of the RUs 330 in association with the combinations of the RUs 330. In other words, the communication IF unit 110 receives sets of table information on the respective MNOs from the individual control devices 200a and 200b of the respective MNOs. The communication IF unit 110 transmits instruction information that makes instructions to increase or reduce the bands of the RUs 330 used by the respective MNOs to the individual control devices 200.

The processor 120 includes, for example, a CPU (Central Processing Unit), a FPGA (Field Programmable Gate Array) or a DSP (Digital Signal Processor), etc., and performs integrated control on the entire common control device 100. Specifically, the processor 120 includes a table information acquisition unit 121, a value-of-change calculator 122, a maximum value determination unit 123, and an instruction information generator 124.

The table information acquisition unit 121 acquires table information on each of the MNOs from the communication IF unit 110. In other words, the table information acquisition unit 121 acquires table information presenting an effect evaluation value in the case where the used bands are increased and reduced with respect to each combination of the RUs 330. The table information stores an effect evaluation value that evaluates an effect on communication performed by the UE 340 in the case where the used band of the RU 330 that is one of the RUs 330 in combination is increased and the used band of the other RU 330 is reduced. For example, in the table information on the first MNO, effect evaluation values that evaluate effects on communication by the UE 340 that belongs to the first MNO in the case where the used bands of both the RUs 330 are increased and reduced by each predetermined amount with respect to each combination of the RUs 330. For example, an amount of change in proportional fairness (PF) utility that is an index value of fairness and system throughput of band allocation, or the like, is usable as the effect evaluation values.

Based on the table information, the value-of-change calculator 122 calculates a value of change in the case where allocation of bands of the RUs 330 to the MNOs is changed without changing the sum of used bands in the respective RUs 330. Specifically, as for a combination of the RUs 330, the value-of-change calculator 122 calculates, from the table information, a value of change in the case where allocation of the band of one of the RUs 330 to the first MNO is increased and allocation to the second MNO is reduced and allocation of the band of the other RU 330 to the first MNO is reduced and allocation to the second MNO is increased. The value-of-change calculator 122 sequentially calculates values of change of the respective combinations of the RUs 330 and of the respective combinations of the MNOs from the effect evaluation values of the respective combinations and outputs the value of changes to the maximum value determination unit 123.

The maximum value determination unit 123 compares the value of changes of the respective combinations of the RUs 330 and the respective combinations of the MNOs that are calculated by the value-of-change calculator 122 and specifies the maximum value of value of change. In other words, the maximum value determination unit 123 compares the value of changes that are calculated sequentially by the value-of-change calculator 122 and specifies a combination of the RUs 330 and a combination of the MNOs that maximize the value of change.

The instruction information generator 124 generates instruction information that instructs each of the MNOs to increase or reduce the used band of the RU 330 from the combination of the RUs 330 and the combination of the MNOs that are specified by the maximum value determination unit 123. Specifically, with respect to the combinations that maximize the value of change, the instruction information generator 124 generates instruction information to the first MNO that makes an instruction to increase allocation of the band of one of the RUs 330 to the first MNO and instruction information to the second MNO that makes an instruction to reduce allocation of the band of one of the RUs 330 to the second MNO and increase allocation of the band of the other RU 330 to the second MNO. The instruction information generator 124 transmits the instruction information to the individual control devices 200a and 200b of the respective MNOs from the communication IF unit 110.

The memory 130 includes, for example, a random access memory (RAM), a read only memory (ROM), or the like, and stores information that is used for processing performed by the processor 120.

Figure 3:
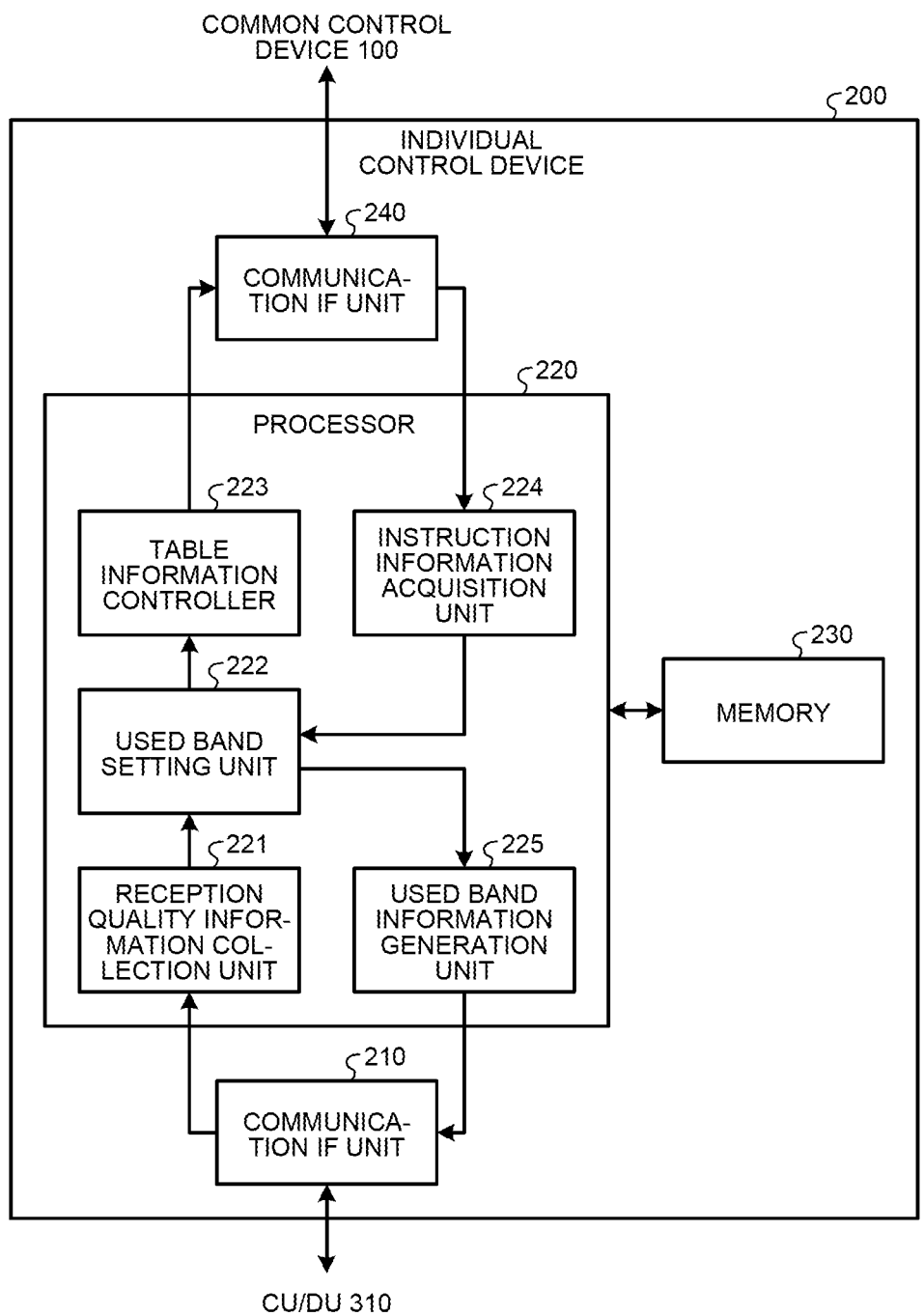
FIG. 3 is a block diagram illustrating a configuration of an individual control device according to the embodiment.

FIG. 3 is a block diagram illustrating a configuration of the individual control device 200 according to the embodiment. The individual control device 200 illustrated in FIG. 3 includes communication IF units 210 and 240, a processor 220, and a memory 230.

The communication IF unit 210 is connected to the CU/DUs 310 of the MNO of subject, receives information from the CU/DUs 310, and transmits information to the CU/DUs 310. Specifically, the communication IF unit 210 receives the reception quality information on reception quality between the UE 340 that belongs to the MNO of subject and the RU 330. The communication IF unit 210 transmits used band information presenting a used band of each RU 330 that the MNO of subject uses to the CU/DU 310.

The processor 220 includes, for example, a CPU, a FPGA, or a DSP, etc., and performs integrated control on the entire individual control device 200. Specifically, the processor 220 includes a reception quality information collection unit 221, a used band setting unit 222, a table information controller 223, an instruction information acquisition unit 224, and a used band information generation unit 225.

The reception quality information collection unit 221 collects sets of reception quality information on all the sets of the UE 340 that belong to the MNO of subject. In other words, the reception quality information collection unit 221 collects sets of reception quality information representing reception quality, such as a reference signal received power (RSRP) at the UE 340 of the MNO of subject, from the CU/DUs 310 of the MNO of subject. The UE 340 measures the reception quality with respect to not only the RU 330 that is the partner of radio communication but also all the RUs 330 in an area from which reference signals are receivable and therefore the reception quality information on one set of the UE 340 contains quality of reception from each of the RUs 330.

The used band setting unit 222 sets an increase and a decrease of the used bands of the RUs 330 based on the reception quality information. Specifically, the used band setting unit 222 searches for an optimum used band that maximizes the index value, such as a PF utility, and that is optimum to the MNO of subject with respect to each of the RUs 330. The used band setting unit 222 assumes that the used band of one of the RUs 330 in each combination is increased by a predetermined amount and the used band of the other RU 330 is reduced by a predetermined amount and searches for optimum used bands of the respective RUs 330 that maximize the index value under the assumption.

Once the optimum used bands of the respective RUs 330 are specified, the used band setting unit 222 notifies the table information controller 223 of the combination of the RUs 330 at that time and notifies the table information controller 223 of an amount of change in the index value that varies because the used bands are increased and reduced as an effect evaluation value. In other words, the used band setting unit 222 notifies the table information controller 223 of, together with the combination of the RUs 330, the effect evaluation value in the case where the bands used by the MNO of subject are increased and reduced with respect to each combination of the RUs 330.

Once the instruction information acquisition unit 224 notifies the used band setting unit 222 of the RUs 330 whose bands used by the MNO of subject are increased and reduced, the used band setting unit 222 notifies the used band information generation unit 225 of the optimum used bands that are specified with respect to the combination of the RUs 330.

Based on the notification from the used band setting unit 222, the table information controller 223 generates table information that stores the effect evaluation value in association with the combination of the RUs 330. In other words, the table information controller 223 generates table information that stores the effect evaluation value, such as an amount of change in the PR utility, caused by the increase and decrease of the used bands in association with sets of identification information of the RUs 330 that identify the RU 330 whose band used by the MNO of subject is increased by the predetermined amount and the RU 330 whose band used by the MNO of subject is reduced by the predetermined amount, respectively. The used band setting unit 222 assumes an increase and a decrease of the used bands with respect to each combination of the RUs 330 and calculates an effect evaluation value and therefore the table information controller 223 generates table information that stores an effect evaluation value in the case where the bands used by the MNO of subject are increased and reduced with respect to all the combinations of the RU 330. The table information controller 223 then causes the generated table information to be transmitted from the communication IF unit 240 to the common control device 100.

The instruction information acquisition unit 224 acquires, from the communication IF unit 240, the instruction information that makes instructions on the combination of the RUs 330 whose bands used by the MNO of subject are increased and reduced. In other words, the instruction information acquisition unit 224 acquires the instruction information that makes instructions on the RU 330 whose band used by the MNO of subject is increased and on the RU 330 whose band used by the MNO of subject is reduced. The instruction information acquisition unit 224 notifies the used band setting unit 222 of the combination of the RUs 330 whose bands used by the MNO of subject are increased and reduced.

The used band information generation unit 225 generates used band information that makes an instruction on the used bands of the combination of the RUs 330 of which the used band information generation unit 225 is notified by the used band setting unit 222. In other words, the used band information generation unit 225 generates used band information that makes an instruction on optimum used bands of the respective RUs 330 of the combination of the RUs 330. The used band information generation unit 225 then transmits the used band information from the communication IF unit 210 to the CU/DUs 310 of the MNO of subject.

The memory 230 includes, for example, a RAM or a ROM, etc., and stores information that is used for processing performed by the processor 220.

The communication IF unit 240 is connected to the common control device 100, transmits information to the common control device 100, and receives information from the common control device 100. Specifically, the communication IF unit 240 transmits the table information to the common control device 100. The communication IF unit 240 receives instruction information from the common control device 100.

Figure 4:
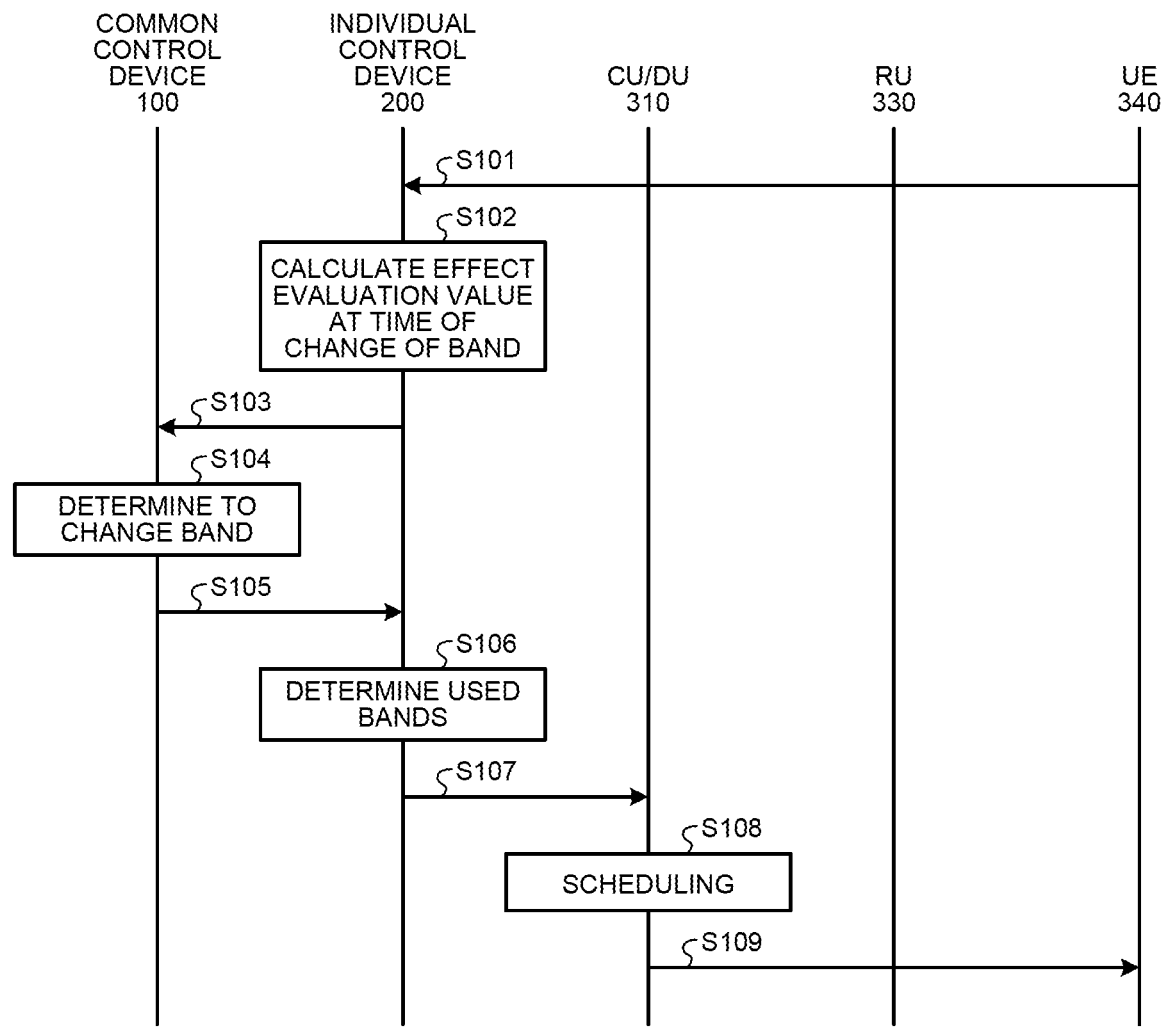
FIG. 4 is a sequence chart illustrating a method of determining a band that is used.

A method of determining a band that is used in a communication system configured as described above will be described next with reference to the sequence chart illustrated in FIG. 4.

The UE 340 of each MNO receives a reference signal from each RU 330 and measures reception quality, such as a RSRP. The UE 340 reports on information on the sets of reception quality that are measured, respectively, to the CU/DUs 310 of the same MNO via the RUs 330 and the CU/DUs 310 transmit reception quality information to the individual control device 200 (step S101). The reception quality information contains the sets of quality of reception from the respective RUs 330 at each set of the UE 340.

The sets of reception quality information from the respective sets of the UE 340 are collected by the reception quality information collection unit 221 of the individual control device 200 and, based on the sets of reception quality information, optimum used bands in the case where the used bands are increased and reduced with respect to each combination of the RUs 330 are searched for by the used band setting unit 222. Specifically, it is assumed that the used band of one of the RUs 330 in combination is increased by the predetermined amount and the used band of the other RU 330 is reduced by the predetermined amount and, under the assumption, used bands of the respective RUs 330 that maximize the index value, such as a RF utility, are searched for. An amount of change in the index value in the case where a change is made to the optimum used bands with respect to each combination of the RUs 330 is calculated as an effect evaluation value (step S102).

The effect evaluation value of each combination of the RUs 330 is stored by the table information controller 223 in the table information in association with identification information of the RUs 330 whose used bands are increased and reduced. Once the effect evaluation values with respect to all the combinations of the RUs 330 are stored in the table information, the table information is transmitted to the common control device 100 (step S103). The table information is for storing the effect evaluation values with respect to the respective combinations of the RUs 330 and therefore is information of a certain size regardless of the number of the sets of the UE 340 that belong to the MNO of subject. Accordingly, even when the reception quality information that is reported by the UE 340 increases, the amount of information transferred to the common control device 100 does not increase.

The table information is acquired by the table information acquisition unit 121 of the common control device 100. The table information is transmitted from the individual control device 200 of each MNO and therefore the table information acquisition unit 121 acquires sets of table information on the respective MNOs that share the RUs 330. The sets of table information from the respective MNOs are used by the value-of-change calculator 122 and a value of change in the case where allocation of the bands of the RUs 330 to the MNOs is changed without changing the sum of used bands in the respective RUs 330 is calculated.

Specifically, the value of change in the case where allocation of the band of one of the RUs 330 in combination to the first MNO is increased and the allocation to the second MNO is reduced and allocation of the band of the other RU 330 to the first MNO is reduced and the allocation to the second MNO is increased is calculated by adding up the effect evaluation values of the respective MNOs with respect to the combination of the RUs 330. In other words, the sum of the effect evaluation value in the case where the band of the first RU 330 used by the first MNO is increased and the band of the second RU 330 used by the first MNO is reduced and the effect evaluation value in the case where the band of the first RU 330 used by the second MNO is reduced and the band of the second RU 330 used by the second MNO is increased is calculated as a value of change of the combination of the RUs 330 and the combination of the MNOs.

The value of change is calculated for each combination of the RUs 330 and each combination of MNOs and a combination of the RUs 330 and a combination of MNOs that maximize the value of change is specified by the maximum value determination unit 123. The combinations are determined by changing the bands used by the MNOs in the combination of the RUs 330 such that the value of change is maximized (step S104). Using instruction information, the individual control device 200 of each of the MNOs is notified of the combination of the RUs 330 and the combination of MNOs that maximize the value of change (step S105). The instruction information to each of the MNOs contains information that specifies the RU 330 whose band used by the MNO is increased and the RU 330 whose band used by the MNO is reduced.

The instruction information is acquired by the instruction information acquisition unit 224 of the individual control device 200 and the used band setting unit 222 is notified of the RUs 330 whose bands used by the MNO of subject are increased and reduced, and optimum used bands with respect to the combination of the RUs 330 are determined (step S106). In other words, used bands in the respective RUs 330 enabling the best effect evaluation value in the combination of the RUs 330 are determined. The used band information presenting the used bands in the respective RUs 330 is generated by the used band information generation unit 225 and is transmitted to the CU/DUs 310 of the MNO of subject (step S107).

The CU/DU 310 that receives the used band information executes scheduling of the used bands of the respective RUs 330 presented by the used band information (step S108). According to the result of scheduling, data is transmitted from the CU/DU 310 to the UE 340 via the RU 330 (step S109).

Figure 5:
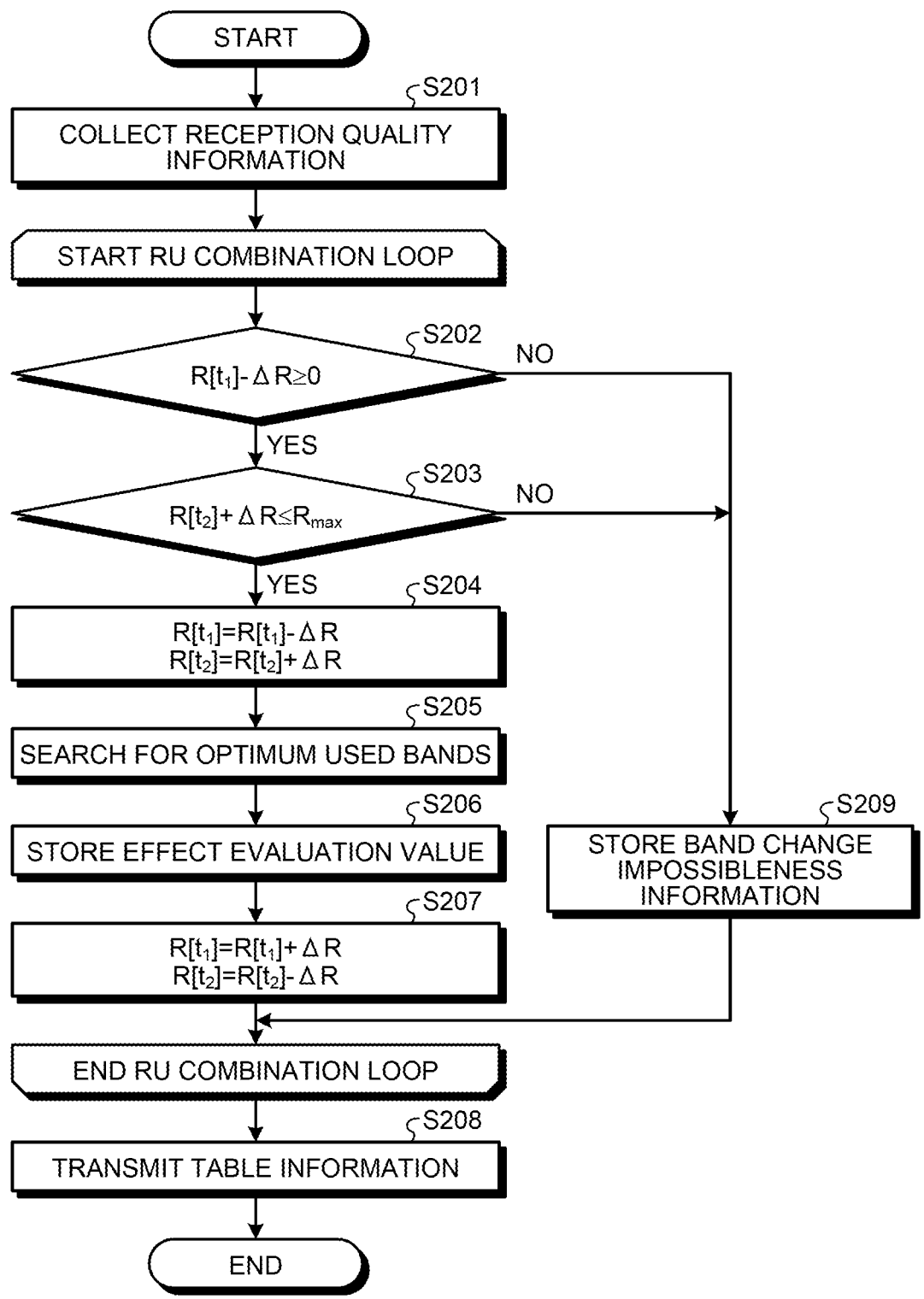
FIG. 5 is a flowchart illustrating an effect evaluation value calculation process.

An effect evaluation value calculation process performed by the individual control device 200 will be described specifically with reference to the flowchart presented in FIG. 5. The evaluation value calculation process is a process at step S102 in FIG. 4 and is executed mainly by the used band setting unit 222 and the table information controller 223 of the individual control device 200.

First of all, reception quality information from the UE 340 that belongs to the MNO of subject is collected by the reception quality information collection unit 221 (step S201). Sets of reception quality information from the respective RUs 330 to the respective sets of the UE 340 are collected here. A loop of a process of calculating an effect evaluation value in the case where the used bands are increased and reduced with respect to a combination of two RUs 330 of the RUs 330 is started. The two RUs 330 configuring the combination will be described below as RU #$t_1$ and RU #$t_2$, respectively.

When the combination of the two RUs 330 on which the process is to be performed is chosen, it is determined whether it is possible to reduce a band R[$t_1$] in RU #$t_1$ used by the MNO of subject by a predetermined amount ΔR (step S202). As a result, when the result of subtracting the predetermined amount ΔR from the used band R[$t_1$] is smaller than 0 (No at step S202), it is impossible to reduce the used band R[$t_1$] in RU #$t_1$ and band change impossibleness information is stored in the table information in association with the combination of RU #$t_1$ and RU #$t_2$ (step S209).

On the other hand, when the result of subtracting the predetermined amount ΔR from the used band R[$t_1$] is equal to or larger than 0 (Yes at step S202), it is subsequently determined whether it is possible to increase a band R[$t_2$] in RU #$t_2$ used by the MNO of subject by a predetermined amount ΔR (step S203). As a result, when the result of adding the predetermined amount ΔR to the used band R[$t_2$] exceeds a predetermined maximum band $R_{max}$ (No at step S203), it is impossible to increase the used band R[$t_2$] in RU #$t_2$ and band change impossibleness information is stored in the table information in association with the combination of RU #$t_1$ and RU #$t_2$ (step S209).

When the result of adding the predetermined amount ΔR to the used band R[$t_2$] is equal to or smaller than the predetermined maximum band $R_{max}$ (YES at step S203), it is assumed that the used band R[$t_1$] is reduced by the predetermined amount ΔR and the used band R[$t_2$] is increased by the predetermined amount ΔR (step S204). Under the assumption, positions of optimum used bands that maximize an index value, such as a PF utility, are searched for with respect to respective RU #$t_1$ and RU #$t_2$ (step S205). The positions of the optimum used bands of RU #$t_1$ and RU #$t_2$ are stored in the used band setting unit 222.

An amount of change in the index value resulting from setting of the optimum used bands is stored in the table information as an effect evaluation value in the case where the used bands are increased and reduced with respect to the combination of RU #$t_1$ and RU #$t_2$ (step S206). When the effect evaluation value is stored in association with the combination of RU #t and RU #$t_2$, the used band R[$t_1$] is increased by the predetermined amount ΔR and the used band R[$t_2$] is reduced by the predetermined amount ΔR for restoration to the original from the assumption on the used bands (step S207).

The table information on the MNO of subject is generated by repeating the process above with respect to all the combinations of the RUs 330. For example, as illustrated in FIG. 6, the table information stores the effect evaluation values each in association with identification information on the RU 330 on which it is assumed that the used band is reduced and the identification information on the RU 330 on which it is assumed that the used band is increased. In FIG. 6, "-" of the effect evaluation value represents band change impossibleness information. Thus, for example, because it is impossible to reduce the used band of RU #0 or increase the used band of RU #1, the band change impossibleness information "-" is stored in association with the sets of identification information of these RUs 330.

For example, an effect evaluation value "1.2" is stored for a reduction in the used band of RU #0 and an increase in the used band of RU #3. This presents that the index value, such as an RF utility, increases by 1.2 when the used band of RU #0 is reduced by the predetermined amount and the used band of RU #3 is increased by the predetermined amount. On the other hand, for example, an effect evaluation value "-1.7" is stored for a reduction in the used band of RU #3 and an increase in the used band of RU #0. This presents that the index value, such as an RF utility, decreases by 1.7 when the used band of RU #3 is reduced by the predetermined amount and the used band of RU #0 is increased by the predetermined amount. As described above, the table information stores an effect evaluation value in the case where the used bands are increased and reduced with respect to each combination of the RUs 330. The effect evaluation value is not limited to an amount of change in the RF utility and an amount of change in another index value representing a throughput is usable.

When the table information in which the effect evaluation values on all the combinations of the RUs 330 are stored is generated, the table information is transmitted to the common control device 100 (step S208). Each of the individual control devices 200 transmits the table information of the MNO of subject and therefore the common control device 100 receives sets of table information on the respective MNOs.

Figure 7:
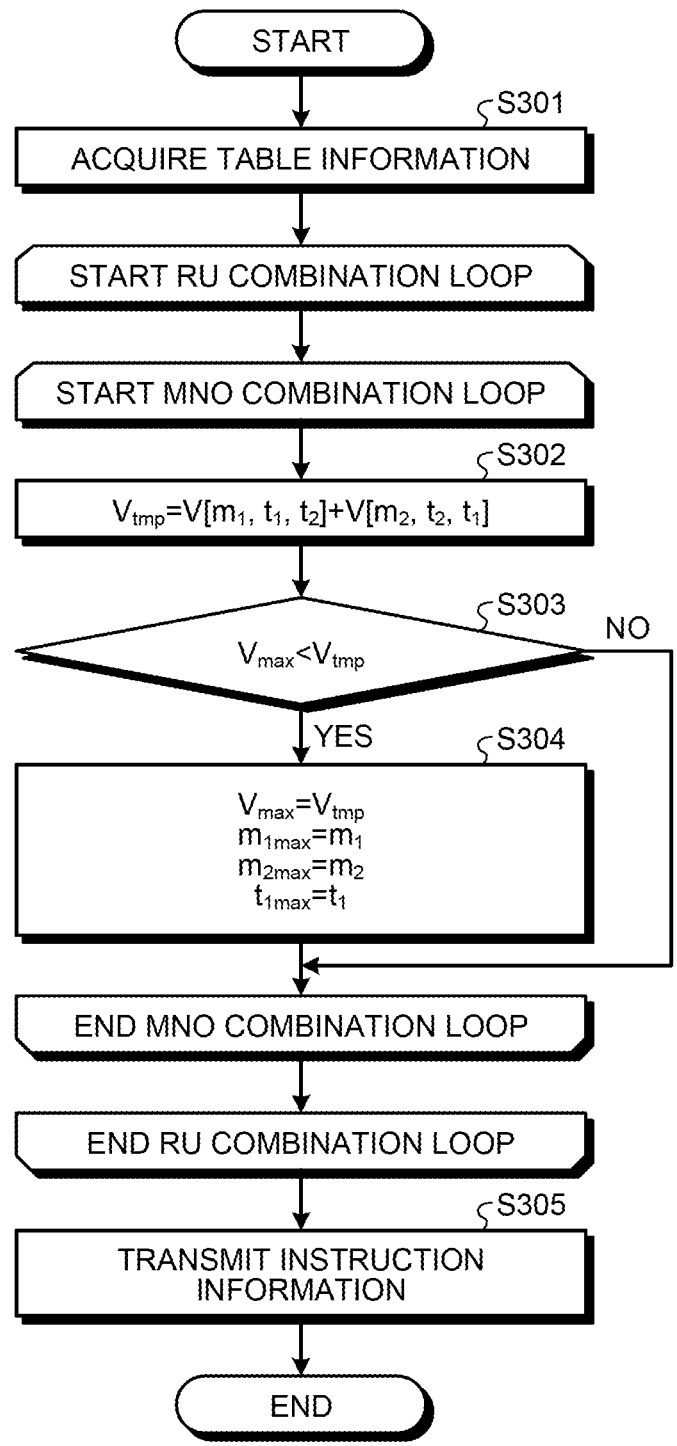
FIG. 7 is a flowchart illustrating a changed band determination process.

A changed band determination process performed by the common control device 100 that receives the table information will be described next with reference to the flowchart illustrated in FIG. 7. The changed band determination process is a process at step S104 in FIG. 4 and is executed mainly by the value-of-change calculator 122 and the maximum value determination unit 123.

First of all, the sets of table information that are transmitted from the individual control devices 200 of the respective MNOs are acquired by the table information acquisition unit 121 (step S301). A loop of a process of calculating a value of changing the used bands with respect to each combination of the RUs 330 and each combination of MNOs by using the sets of table information on the respective MNOs is started. The two RUs 330 configuring the combination of the RUs 330 will be described as RU #$t_1$ and RU #$t_2$, respectively, and two RUs 330 configuring the combination of MNOs will be described as MNO #$m_1$ and MNO #$m_2$, respectively, below.

When the combination of the two RUs 330 and the combination of the two MNOs on which the process is to be performed are chosen, a value of change $V_{tmp}$ in the case where the used band of RU #$t_1$ with respect to MNO #$m_1$ is increased and the used band of RU #$t_2$ with respect to MNO #$m_1$ is reduced and the used band of RU #$t_2$ with respect to MNO #$m_2$ is increased and the used band of RU #$t_1$ with respect to MNO #$m_2$ is reduced is calculated (step S302). Specifically, an effect evaluation value $V[m_1, t_1, t_2]$ in the case where the used band of RU #$t_1$ with respect to MNO #$m_1$ is increased and the used band of RU #$t_2$ with respect to MNO #$m_1$ is reduced is acquired from the table information on MNO #$m_1$. Similarly, an effect evaluation value $V[m_2, t_2, t_1]$ in the case where the used band of RU #$t_2$ with respect to MNO #$m_2$ is increased and the used band of RU #$t_1$ with respect to MNO #$m_2$ is reduced is acquired from the table information on MNO #$m_2$. A value of change $V_{tmp}$ is then calculated by adding up these effect evaluation values $V[m_1, t_1, t_2]$ and $V[m_2, t_2, t_1]$.

The value of change $V_{tmp}$ represents a comprehensive amount of change in the index value, such as an RF utility, in the case where allocation of the bands of the RUs 330 to the MNOs is changed without changing the sum of the used bands of the respective RUs 330. The larger the value of change $V_{tmp}$ is, the more the throughput over the system increases, which improves communication efficiency. Thus, a maximum value $V_{max}$ that is a temporary value of change and the calculated value of change $V_{tmp}$ are compared with each other (step S303) and it is determined whether to update the maximum value $V_{max}$.

When the calculated value of change $V_{tmp}$ is equal to or smaller than the maximum value $V_{max}$ (NO at step S303), because the value of change is not maximized by the currently chosen combinations of the RUs 330 and the MNOs, other combinations of the RUs 330 and MNOs are chosen as combinations on which the process is to be performed next. On the other hand, when the calculated value of change $V_{tmp}$ exceeds the maximum value $V_{max}$ (YES at step S303), the maximum value $V_{max}$ is updated to the value of change $V_{tmp}$. The currently chosen MNO #$m_1$ and MNO #$m_2$ and RU #$t_1$ and RU #$t_2$ are stored as combinations corresponding to the maximum value $V_{max}$ of value of change (step S304). Other combinations of the RUs 330 and MNOs are then chosen as the next combinations on which the process is to be performed.

By repeating the process above with respect to all the combinations of the RUs 330 and the MNOs, the maximum value $V_{max}$ of value of change is determined and combinations of the RUs 330 and MNOs corresponding to the maximum value $V_{max}$ are determined. Sets of instruction information to the individual control devices 200 of the respective MNOs are thus generated by the instruction information generator 124. Specifically, instruction information that instructs MNO #$m_{1max}$ corresponding to the maximum value $V_{max}$ to increase the used band of RU #$t_{1max}$ and reduce the used band of RU #$t_{2max}$ is generated. Furthermore, instruction information that instructs MNO #$m_{2max}$ corresponding to the maximum value $V_{max}$ to increase the used band of RU #$t_{2max}$ and reduce the used band of RU #$t_{1max}$ is generated. The generated sets of instruction information are transmitted to the individual control devices 200 corresponding to MNO #$m_{1max}$ and MNO #$m_{2max}$, respectively (step S305).

As described above, the sets of table information that are generated by the individual control devices 200 of the respective MNOs are consolidated in the common control device 100 and the combination of the RUs 330 and the combination of the MNOs that maximize the value of changing the used bands are determined. Thus, when the RUs 330 are shared by a plurality of MNOs, it is possible to optimize allocation of used bands of the RUs 330 to each MNO. The sets of table information on the respective MNOs are consolidated in the common control device 100 and therefore it is possible to reduce the amount of information transfer to the common control device 100 compared to the case where sets of reception quality information in all the sets of the UE 340 are consolidated in the common control device 100.

Figure 8:
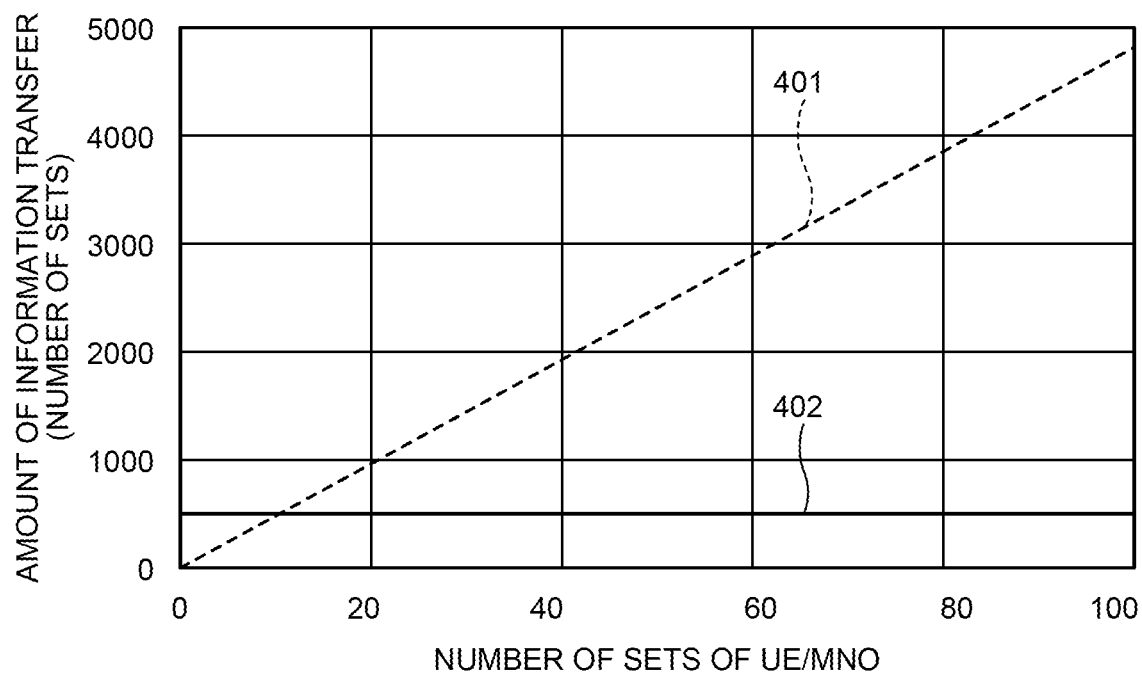
FIG. 8 is a chart illustrating a specific example of an amount of information transfer to the common control device.

FIG. 8 is a chart illustrating a specific example of the amount of information transfer to the common control device 100. FIG. 8 presents the relationship between the number of sets of the UE 340 per MNO and the amount of information that is transferred to the common control device 100 in the case where twelve RUs 330 are shared by four MNOs. The dotted straight line 401 represents the amount of information transfer in the case where the sets of reception quality information of the respective sets of the UE 340 are consolidated in the common control device 100 and the solid straight line 402 represents the amount of information transfer in the case where the sets of table information on the respective MNOs are consolidated in the common control device 100 as in the embodiment.

As illustrated in FIG. 8, when the sets of reception quality information of the sets of the UE 340 are consolidated in the common control device 100, the amount of information transfer to the common control device 100 increases as the number of sets of the UE 340 per MNO increases. On the other hand, when the sets of table information on the respective MNOs are consolidated in the common control device 100, the amount of information transfer to the common control device 100 is constant even when the number of sets of the UE 340 per MNO increases. For this reason, when the number of sets of the UE 340 per MNO is close to 100, the amount of information transfer to the common control device 100 in the case where sets of table information are consolidated is about one-ninth that in the case where sets of reception quality information are consolidated.

As described above, according to the embodiment, the individual control device of each MNO calculates an effect evaluation value in the case where used bands are increased and reduced with respect to each combination of RUs based on the reception quality information of sets of UE, generates table information that stores the combination of RUs and the effect evaluation value in association with each other, and transmits the table information to the common control device. The common control device determines, from the sets of table information on the respective MNOs, the combinations of RUs and MNOs that maximize the value of change in the case where the used bands are increased and reduced, and instructs the individual control devices of the respective MNOs to increase and reduce the used bands of the RUs of the determined combination. Thus, when a plurality of RUs are shared by a plurality of MNOs, it is possible to optimize allocation of used bands to each MNO. Furthermore, it is possible to inhibit an increase in the amount of information transfer to the common control device that controls the MNOs cross-sectionally.

According to a mode of the communication system and the communication control device disclosed herein, an effect that it is possible to inhibit an increase in the amount of information transfer is achieved.

All examples and conditional language provided herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosure have been described in detail, it should be understood that the various changes, substitutions, and alterations could be made hereto without departing from the spirit and scope of the disclosure.

What is claimed is:

1. A communication system comprising a plurality of first communication control devices that are arranged in association with a plurality of operators; and a second communication control device that is connected to the first communication control devices, wherein
the first communication control devices include
a first processor configured to execute, with respect to each combination of radio devices that the operators share, calculating an effect evaluation value in a case where bands used by an operator of subject are increased and reduced; and
a first transmitter configured to transmit information containing the effect evaluation value to the second communication control device, and
the second communication control device includes
a receiver configured to receive the information containing the effect evaluation value from each of the first communication control devices;
a second processor configured to execute: using the effect evaluation value of each combination of radio devices in each operator, specifying a combination of radio devices and a combination of operators that maximize a value of change in a case where each operator changes the used bands of the radio devices, and
generating instruction information that instructs the first communication control devices corresponding to the operators of the specified combination to increase and reduce the used bands of the radio devices of the specified combination; and
a second transmitter configured to transmit the instruction information.

2. The communication system according to claim 1, wherein the first processor is configured to further execute collecting reception quality information from terminal devices that perform radio communication with the radio devices, and
the calculating includes calculating an effect evaluation value with respect to each combination of the radio devices based on the collected reception quality information.

3. The communication system according to claim 1, wherein the calculating includes calculating, as the effect evaluation value, an amount of change in an index value representing a throughput in a case where the used band of one of the radio devices configuring the combination of the radio devices is increased and the used band of another radio device is reduced.

4. The communication system according to claim 1, wherein the specifying includes
calculating the value of change by adding up an effect evaluation value in a case where a first operator increases the used band of one of the radio devices configuring the combination of the radio devices and reduces the used band of another radio device and an effect evaluation value in a case where a second operator reduces the used band of the one of the radio devices and increases the used band of the another radio device, and
specifying a combination of the one of the radio devices and the another radio device, and a combination of the first operator and the second operator that maximize the calculated value of change.

5. The communication system according to claim 1, wherein the first processor is configured to further execute generating table information that stores an effect evaluation value in association with the combination of the radio devices, and
the first transmitter is configured to transmit the table information to the second communication control device.

6. The communication system according to claim 1, wherein the first processor is configured to further execute determining used bands of radio devices according to the instruction information that is received from the second communication control device.

* * * * *